US010160479B2

(12) United States Patent
Cymbal et al.

(10) Patent No.: US 10,160,479 B2
(45) Date of Patent: Dec. 25, 2018

(54) ECCENTRIC ADJUSTMENT RETAINER

(71) Applicant: Steering Solutions IP Holding Corporation, Saginaw, MI (US)

(72) Inventors: William D. Cymbal, Freeland, MI (US); Patrick D. McCall, W. Saginaw, MI (US); Jeffrey E. Beyerlein, Frankenmuth, MI (US); Jason T. Rutkiewicz, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 526 days.

(21) Appl. No.: 14/795,359

(22) Filed: Jul. 9, 2015

(65) Prior Publication Data
US 2017/0008553 A1    Jan. 12, 2017

(51) Int. Cl.
B62D 5/04    (2006.01)
F16H 57/12   (2006.01)
F16H 1/16    (2006.01)

(52) U.S. Cl.
CPC .......... *B62D 5/0403* (2013.01); *B62D 5/046* (2013.01); *B62D 5/0409* (2013.01); *F16H 57/12* (2013.01); *F16H 1/16* (2013.01)

(58) Field of Classification Search
CPC ....... B62D 5/0403; B62D 5/046; F16H 57/12; F16H 1/16
USPC ......................................... 180/443, 444, 446
See application file for complete search history.

(56) References Cited

U.S. PATENT DOCUMENTS

| 7,188,700 | B2 * | 3/2007 | Eda ...................... | B62D 5/0409 |
| | | | | 180/444 |
| 7,748,492 | B2 * | 7/2010 | Iwasa .................. | B62D 5/0409 |
| | | | | 180/444 |
| 8,997,597 | B2 * | 4/2015 | Rupp .................. | B62D 5/0424 |
| | | | | 74/388 PS |
| 9,533,701 | B2 * | 1/2017 | Cymbal ............... | B62D 5/0409 |
| 9,637,164 | B2 * | 5/2017 | Shavrnoch .......... | F16H 25/2204 |
| 9,664,273 | B2 * | 5/2017 | Mehl .................... | F16H 57/022 |
| 2007/0251757 | A1 * | 11/2007 | Segawa ............... | B62D 5/0409 |
| | | | | 180/444 |

(Continued)

FOREIGN PATENT DOCUMENTS

CN    101828051 A    9/2010

OTHER PUBLICATIONS

Chinese Office Action and Search Report for Chinese Application No. 201610535070.6 dated Feb. 14, 2018, 7 pages.

*Primary Examiner* — Jacob D Knutson
(74) *Attorney, Agent, or Firm* — Cantor Colburn LLP

(57) ABSTRACT

According to one exemplary embodiment of the present invention an eccentric adjuster assembly is provided. The eccentric adjuster assembly includes a housing, an eccentric adjuster, an axial retainer, and an eccentric adjuster retainer configured to retain the eccentric adjuster relative to the housing, the eccentric adjuster having an eccentric adjuster radial position and an eccentric adjuster axial position. The eccentric adjuster retainer includes a retainer body having an inner perimeter with a cavity disposed therein and an outer perimeter, the eccentric adjuster extending through the cavity and at least a portion of the outer perimeter engaging the housing to retain the eccentric adjuster radial position relative to the housing.

8 Claims, 7 Drawing Sheets

(56) References Cited

U.S. PATENT DOCUMENTS

2012/0227526 A1 9/2012 Lescorail et al.
2013/0283940 A1 10/2013 Boussaguet et al.

\* cited by examiner

US 10,160,479 B2

ECCENTRIC ADJUSTMENT RETAINER

FIELD OF THE INVENTION

The subject invention relates to an eccentric adjuster retainer and more particularly an eccentric adjuster retainer suitable for use in electric power steering units and systems.

BACKGROUND

In an Electric Power Steering (EPS) unit an electric motor drives a worm shaft and worm gear to provide assist torque to the turning of a steering shaft. This reduces the effort required to steer a vehicle. In certain applications, the mesh between the worm and the worm gear can significantly impact the responsiveness and feel of the steering system. In certain applications, an eccentric adjuster mechanism can be utilized to adjust the mesh between the worm and the worm gear.

However, adjusting and locking the eccentric adjuster mechanism for installation often requires significant time and complex procedures.

Accordingly, it is desirable to provide an eccentric adjuster retainer to utilize an eccentric adjuster mechanism without the prior disadvantages.

SUMMARY OF THE INVENTION

According to one exemplary embodiment of the present invention an eccentric adjuster assembly is provided. The eccentric adjuster assembly includes a housing, an eccentric adjuster, an axial retainer, and an eccentric adjuster retainer configured to retain the eccentric adjuster relative to the housing, the eccentric adjuster having an eccentric adjuster radial position and an eccentric adjuster axial position. The eccentric adjuster retainer includes a retainer body having an inner perimeter with a cavity disposed therein and an outer perimeter, the eccentric adjuster extending through the cavity and at least a portion of the outer perimeter engaging the housing to retain the eccentric adjuster radial position relative to the housing.

In another exemplary embodiment of the present invention a method for retaining an eccentric adjuster relative to a housing is provided. The eccentric adjuster has an eccentric adjuster radial position and an eccentric adjuster axial position. The method comprises receiving the eccentric adjuster via a cavity of a retainer body. Thereafter, the method includes engaging the housing via at least a portion of an outer perimeter of the retainer body. Thereafter the method includes retaining the eccentric adjuster radial position relative to the housing.

In yet another exemplary embodiment of the present invention, an electric power steering system is provided. The electric power steering system comprises a steering shaft connected to handwheel at one end and a rack and pinion steering mechanism at an opposite end. A steering assist unit comprising an electric motor operated by a controller and driving a worm shaft is provided. The worm shaft includes an eccentric adjuster retainer assembly. The eccentric adjuster assembly includes a housing, an eccentric adjuster, an axial retainer, and an eccentric adjuster retainer configured to retain the eccentric adjuster relative to the housing, the eccentric adjuster having an eccentric adjuster radial position and an eccentric adjuster axial position. The eccentric adjuster retainer includes a retainer body having an inner perimeter with a cavity disposed therein and an outer perimeter, the eccentric adjuster extending through the cavity and at least a portion of the outer perimeter engaging the housing to retain the eccentric adjuster radial position relative to the housing.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DESCRIPTION OF THE EMBODIMENTS

Figure 1:
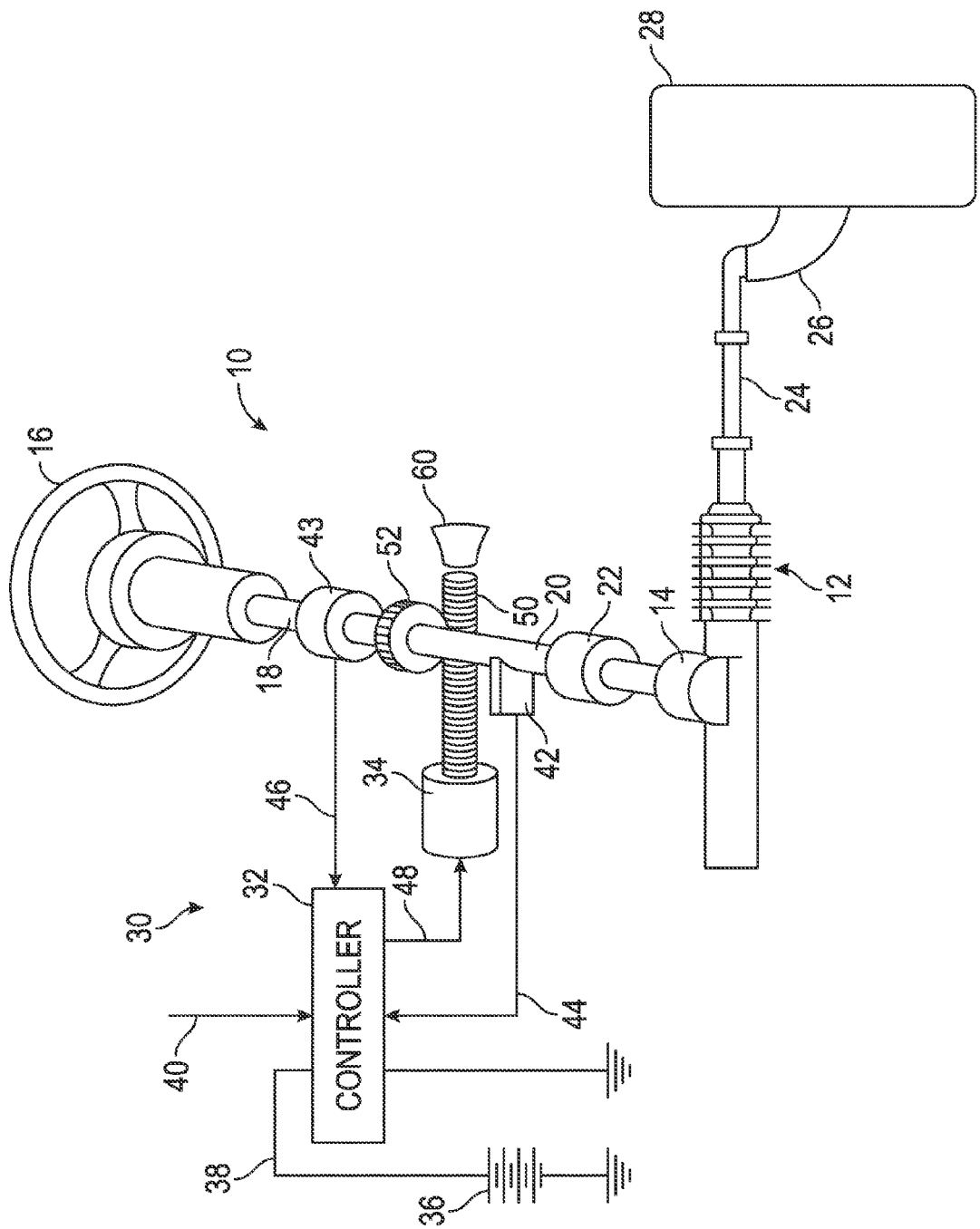
FIG. 1 is a schematic diagram of a power steering system in accordance with the invention.

Referring now to the Figures, where the invention will be described with reference to specific embodiments without limiting same, and in accordance with exemplary embodiments of the present invention, FIG. 1 shows an electric power steering (EPS) system 10 for a motor vehicle. The EPS system 10 includes a rack-and-pinion type steering mechanism 12 that is comprised of a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 and a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through a steering assist unit 30, which includes a controller 32 and an electric motor 34. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar.

In response to the inputs on lines 40, 44 and 46, the controller 32 sends a command signal through a line 48 to the electric motor 34. The motor 34, in turn, supplies an assist torque to the steering system 10 through a worm shaft 50 and a worm gear 52, in order to provide a steering torque assist to the steering system 10 that supplements the steering force exerted by a vehicle operator. In certain embodiments, an eccentric adjuster assembly 60 is utilized to adjust the mesh between the worm shaft 50 and the worm gear 52.

Figure 2:
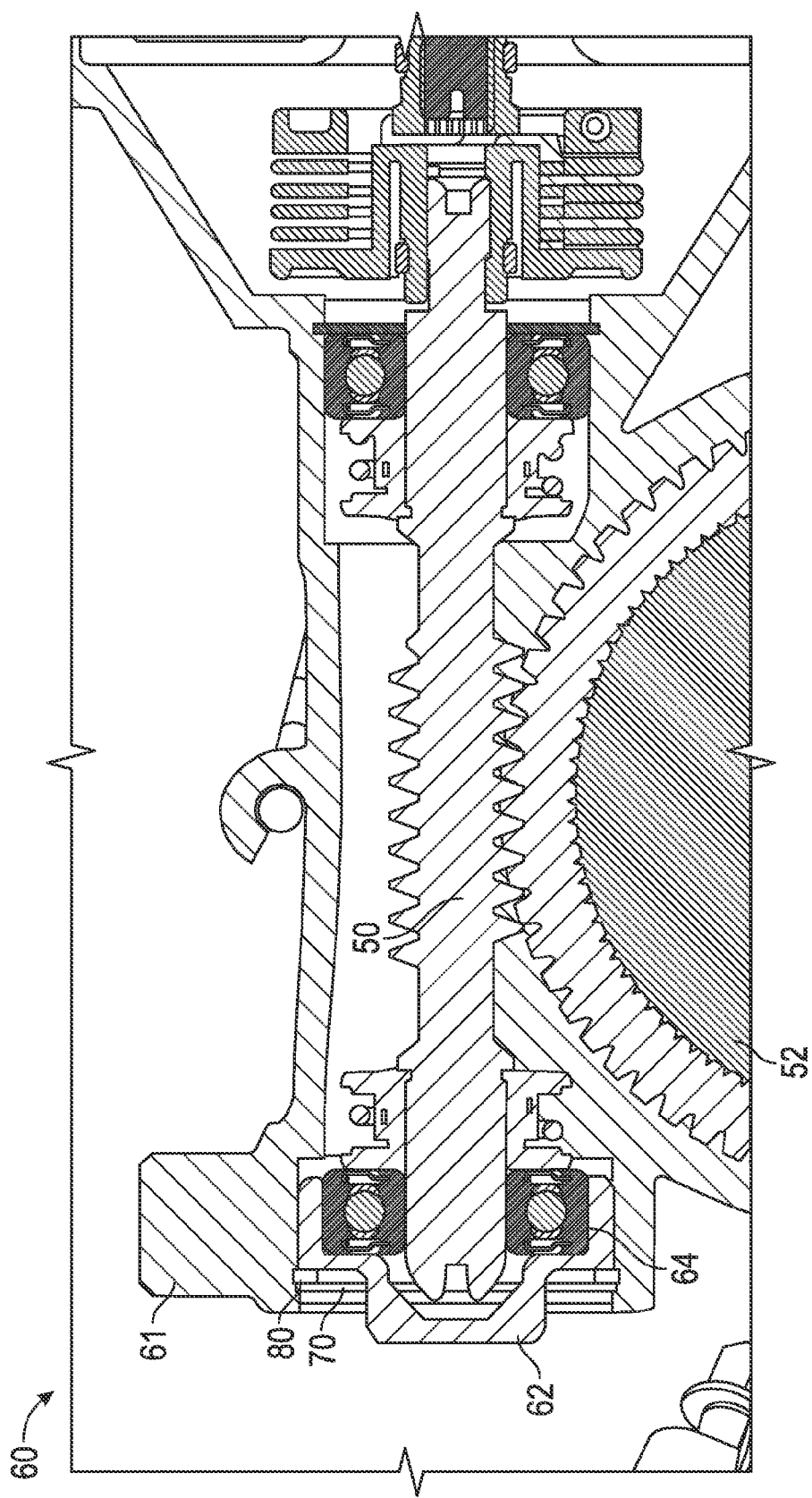
FIG. 2 is a pictorial view of eccentric adjuster assembly suitable for use with a power steering system, such as the power steering system shown in FIG. 1.
Figure 3:
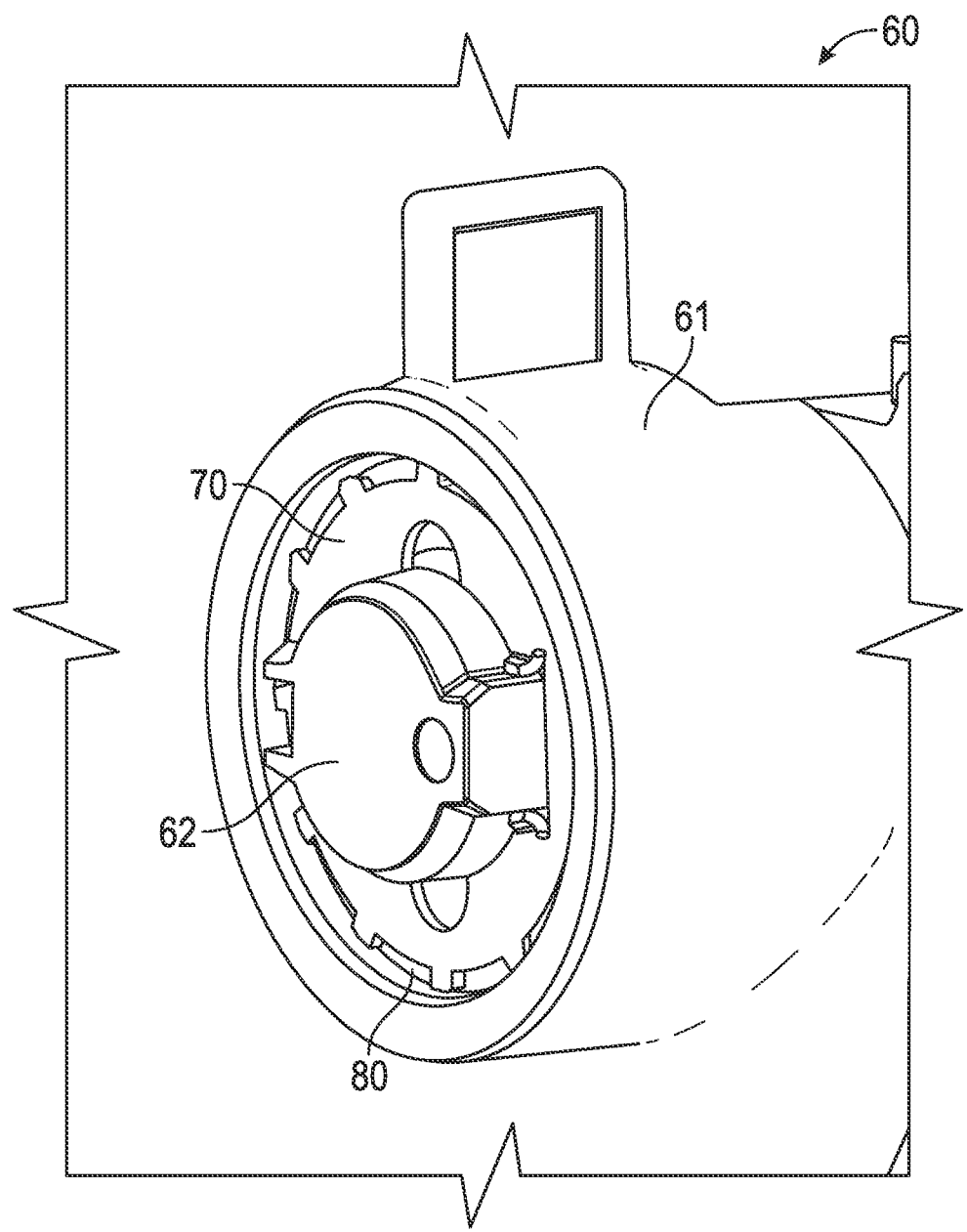
FIG. 3 is another pictorial view of the eccentric adjuster assembly.

Referring to FIGS. 2 and 3, an eccentric adjuster assembly 60 is shown. In an exemplary embodiment, eccentric adjuster assembly 60 includes an assist mechanism housing 61, an eccentric adjuster 62, an eccentric adjuster bearing 64, an eccentric adjuster retainer 70, and a snap ring 80. In an exemplary embodiment, the eccentric adjuster assembly 60 can adjust the mesh or interface between the worm shaft 50 and the worm gear 52 by adjusting the alignment of the worm shaft 50 axis relative to the worm gear 52. In an exemplary embodiment, the worm shaft 50 can be housed in an assist mechanism housing 61.

In certain embodiments, the eccentric adjuster 62 can be utilized to adjust the axial alignment of the worm shaft 50 relative to worm gear 52. The eccentric adjuster 62 can utilize any suitable mechanism to adjust the relative alignment of the worm shaft 50. In certain embodiments, the eccentric adjuster 62 can be rotated to eccentrically move the axis of the worm shaft 50 to effectively adjust the alignment of the worm shaft 50. In certain embodiments, the eccentric adjuster bearing 64 can provide additional support and adjustment of the worm shaft 50.

In an exemplary embodiment, the eccentric adjuster retainer 70 radially retains the eccentric adjuster 62 relative to the assist mechanism housing 61. In certain embodiments, the eccentric adjuster retainer 70 can be adjusted relative to the assist mechanism housing 61 before being pressed or otherwise engaged with assist mechanism housing 61. In certain embodiments, the eccentric adjuster retainer 70 can allow multiple adjustments before being pressed or otherwise engaged within the assist mechanism housing 61. Advantageously, the eccentric adjuster retainer 70 allows for a desired relative alignment between the worm shaft 50 and the worm gear 52 to be retained after the alignment and mesh is set by the eccentric adjuster 62. In an exemplary embodiment, the eccentric adjuster retainer 70 engages with the assist mechanism housing 61 and the eccentric adjuster 62 to maintain a relative radial position of the eccentric adjuster 62. The eccentric adjuster retainer 70 can remove torsional lash in stack conditions between the eccentric adjuster 62 and the assist mechanism housing 61. In certain embodiments, a snap ring 80, also referred to as an axial retainer, axially retains the eccentric adjuster 62 relative to the assist mechanism housing 61. Advantageously, the eccentric adjuster retainer 70 facilitates simplified adjustment of the worm shaft 50 to allow components of various tolerances to work together in a desirable manner. Accordingly, the eccentric adjuster retainer 70 can minimize cost while providing suitable EPS performance.

Figure 4A:
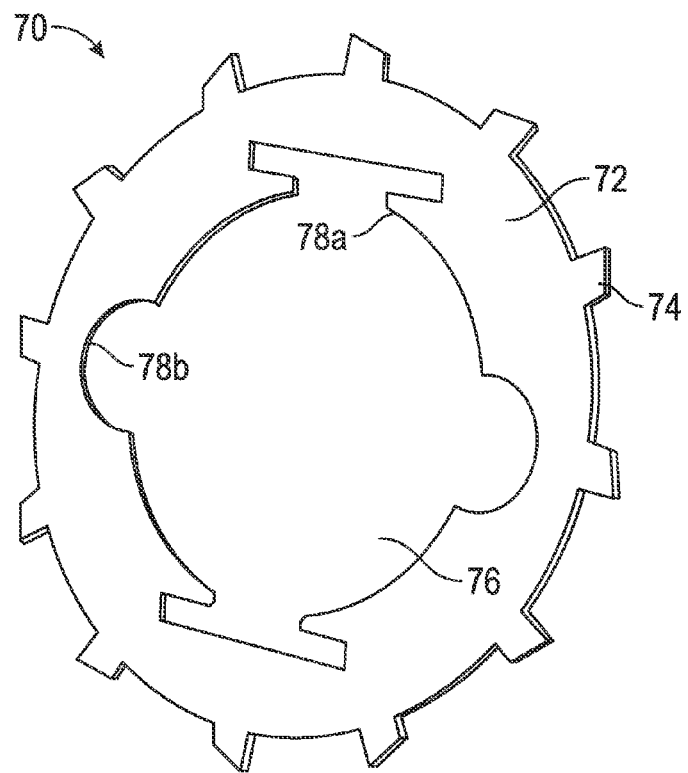
FIG. 4A is a pictorial view of an eccentric adjuster retainer of the eccentric adjuster assembly.

Referring to FIGS. 4A-10 various embodiments of the eccentric adjuster retainer 70 are shown. Each of the similar features are illustrated with like numbers but with a different prefix to identify them as separate embodiments of the invention (e.g. 70, 170, 270, etc.) Referring to FIG. 4A, in an exemplary embodiment, the eccentric adjuster retainer 70 includes a retainer body 72, an outer retaining feature 74, a cavity 76, and inner retaining features 78a, 78b.

The retainer body 72 may be formed of any suitable material. In an exemplary embodiment, the retainer body 72 is formed of a metal. In certain embodiments, the retainer body 72 has a generally circular shape, while in other embodiments, the retainer body 72 can be any suitable shape, including but not limited to square shaped, etc.

In an exemplary embodiment, the outer retaining feature 74 located along at least a portion of the outer perimeter of the retainer body 72 prevents radial movement of the eccentric adjuster retainer 70 and in turn, the eccentric adjuster 62. The outer retaining feature 74 can include teeth or other features configured to engage an assist mechanism housing 61 to prevent rotation. In an exemplary embodiment, the outer retaining features 74 can include teeth angled both to prevent clock wise rotation and counter clockwise rotation relative to the assist mechanism housing 61.

In an exemplary embodiment, at least a portion of the eccentric adjuster 62 extends through the cavity 76, as best seen in FIG. 3. In certain embodiments, the cavity 76 can allow for axial movement of the eccentric adjuster 62. In certain embodiments, the cavity 76 includes an inner perimeter with internal retaining features 78a, 78b to retain the eccentric adjuster 62 and transmit torsional forces to the eccentric adjuster retainer 70. In certain embodiments, the eccentric adjuster retainer 70 can include one or more internal retaining features 78a, 78b. In an exemplary embodiment, the internal retaining feature 78a is a plurality of bendable tabs. In an exemplary embodiment, the bendable tabs of internal retaining feature 78a can interface with designated flat areas of the eccentric adjuster 62 to locate the eccentric adjuster 62 relative to the assist mechanism housing 61 and transmit torsional forces to the eccentric adjuster retainer 70. In certain embodiments, an internal retaining feature 78b is an alternative or supplementary retaining feature. In the illustrated embodiment, the internal retaining feature 78b can interface with a curved protrusion of eccentric adjuster 62 to further radially retain eccentric adjuster 62.

Figure 4B:
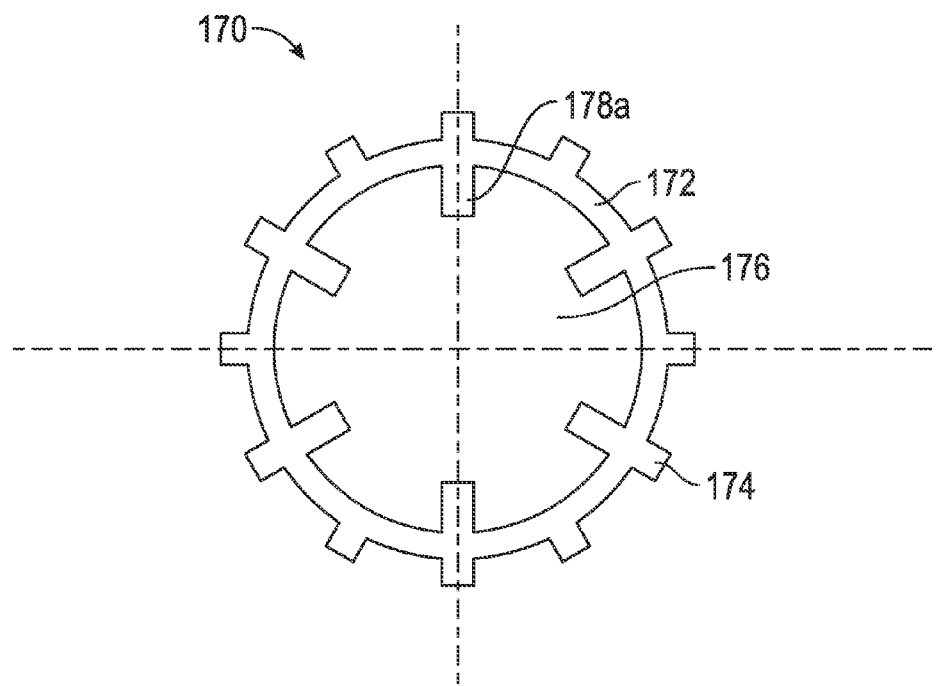
FIG. 4B is a pictorial view of another embodiment of an eccentric adjuster retainer of the eccentric adjuster assembly.

Referring to FIG. 4B, in the illustrated embodiment, the internal retaining feature 178a include teeth features to engage eccentric adjuster 62. In certain embodiments, the teeth features of the internal retaining feature 178a are an extension of the outer retaining feature 174.

Figure 4C:
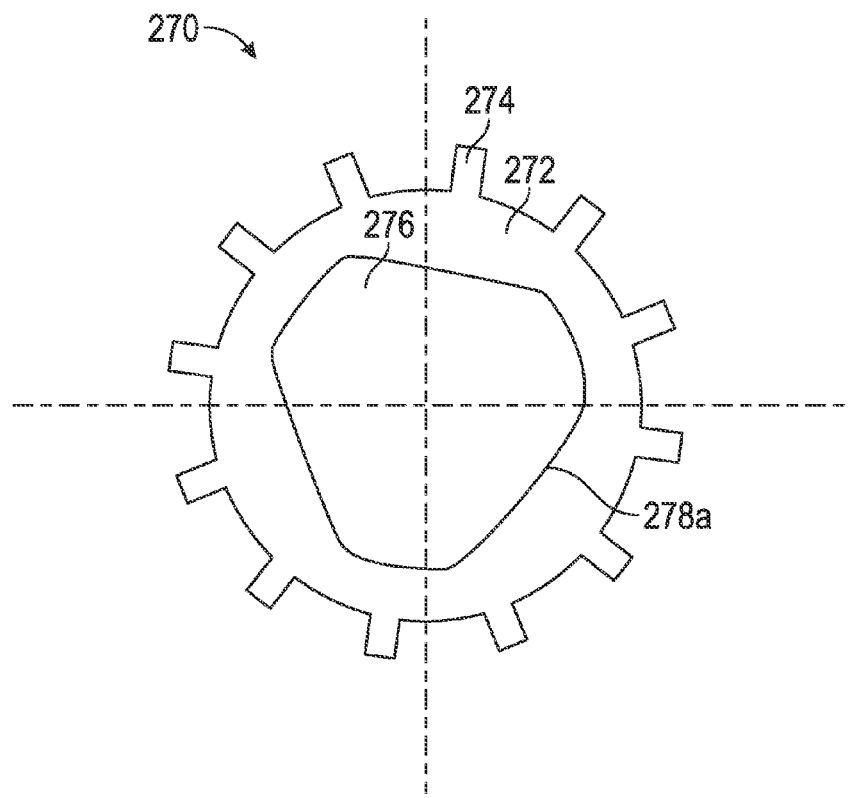
FIG. 4C is a pictorial view of another embodiment of an eccentric adjuster retainer of the eccentric adjuster assembly.

Referring to FIG. 4C, in the illustrated embodiment, the eccentric adjuster retainer 270 includes a cavity 276 with a generally triangular shape. Advantageously, the flat portions of the cavity 276 can transmit a torsional force and radially retain the eccentric adjuster 62. In the illustrated embodiment, the flat portions of the cavity 276 can provide an internal retaining feature 278a.

Figure 5:
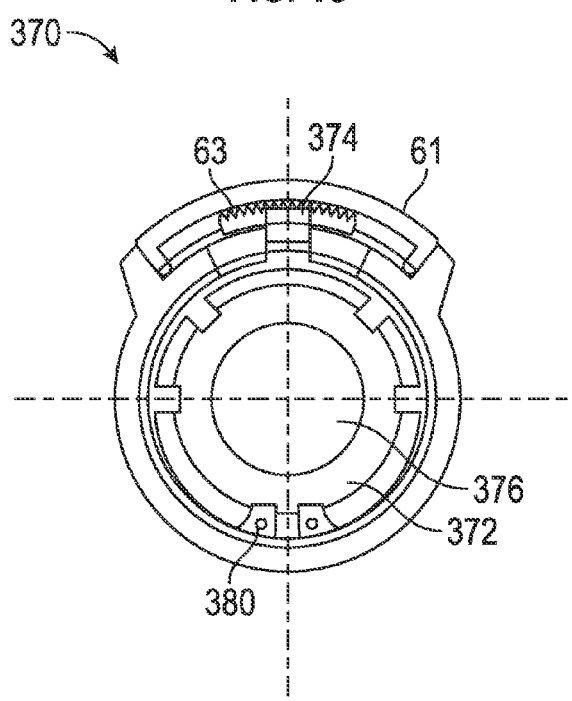
FIG. 5 is a pictorial view of another embodiment of an eccentric adjuster retainer of the eccentric adjuster assembly.

Referring to FIG. 5, in the illustrated embodiment, the outer retaining feature 374 interfaces with the assist mechanism housing 61. In the illustrated embodiment, the assist mechanism housing 61 includes a detent insert 63 with a plurality of raised portions, and the eccentric adjuster retainer 370 includes an outer retaining feature 374 that includes a detent follower. In certain embodiments, the detent follower 374 can engage the detent insert 63 to engage the assist mechanism housing 61 and retain the position of eccentric adjuster 62.

Figure 6:
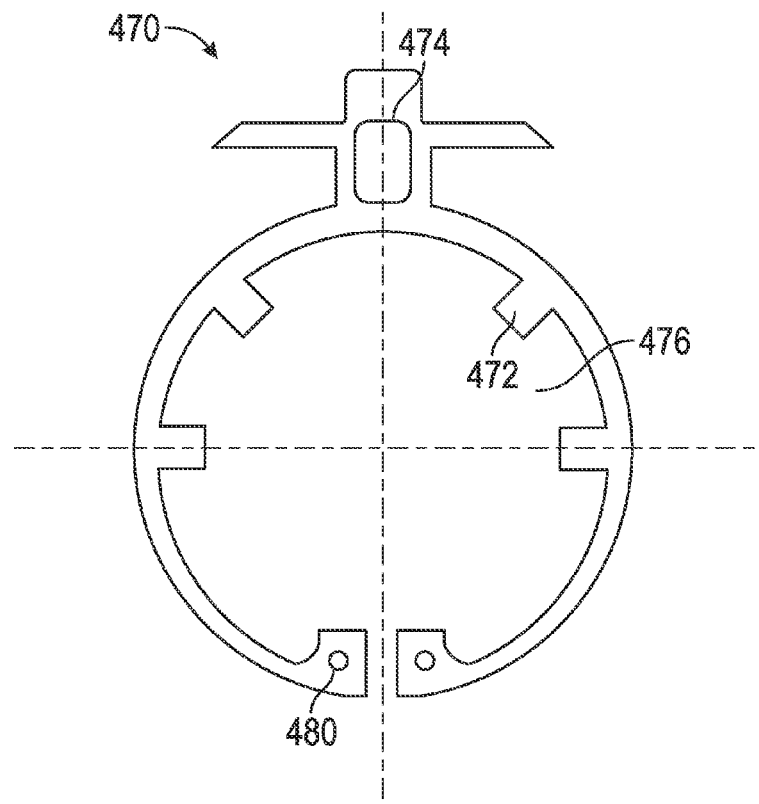
FIG. 6 is a pictorial view of another embodiment of an eccentric adjuster retainer of the eccentric adjuster assembly.

Referring to FIG. 6, in the illustrated embodiment, the outer retaining feature 474 is an adjustment cavity that extends beyond the circular portion of the retainer body 472. In the illustrated embodiment, the outer retaining feature 474 can engage a similar extended feature of the eccentric adjuster 62 to transfer torsional forces to the eccentric adjuster retainer 470. As shown in FIG. 6, the outer retaining feature 474 can extend to react against the assist mechanism housing 61. Advantageously, the eccentric adjuster retainer 470 can receive torsional forces from the eccentric adjuster 62 and retain the eccentric adjuster 62 radially relative to the assist mechanism housing 61. In the illustrated embodiment, the eccentric adjuster retainer 470 is integral with the snap ring 480 to further axially retain the eccentric adjuster 62.

Figure 7:
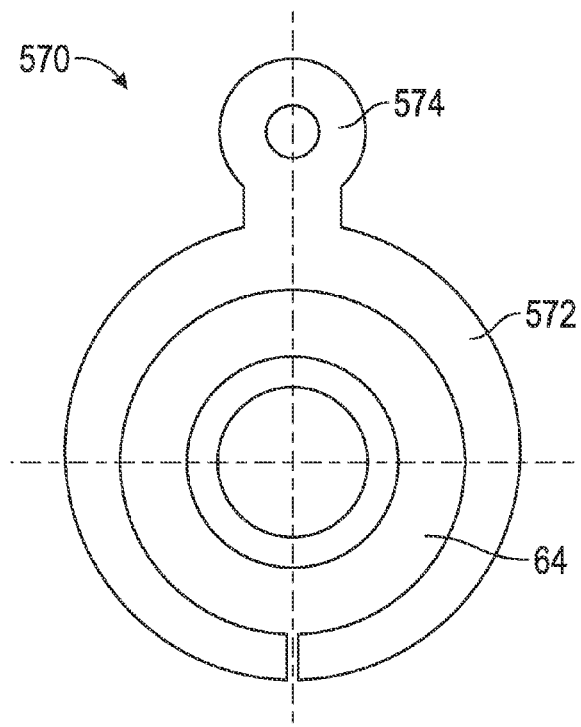
FIG. 7 is a pictorial view of another embodiment of an eccentric adjuster retainer of the eccentric adjuster assembly.

Referring to FIG. 7, in the illustrated embodiment, the outer retaining feature 574 is an adjustment cavity that extends beyond the circular portion of the retainer body 572. In the illustrated embodiment, eccentric adjuster bearing 64 is shown. In the illustrated embodiment, the outer retaining feature 574 can engage a similar extended feature of the eccentric adjuster 62 to transfer torsional forces to the eccentric adjuster retainer 570. In certain embodiments, a screw or other suitable fastener can be inserted in the adjustment cavity to couple the eccentric adjuster retainer 70 and the eccentric adjuster 62. Further, the outer retaining feature 574 can couple to the assist mechanism housing 61 via the fastener. Advantageously, the eccentric adjuster retainer 570 can receive torsional forces from the eccentric adjuster 62 and retain the eccentric adjuster 62 radially relative to the assist mechanism housing 61.

Figure 8:
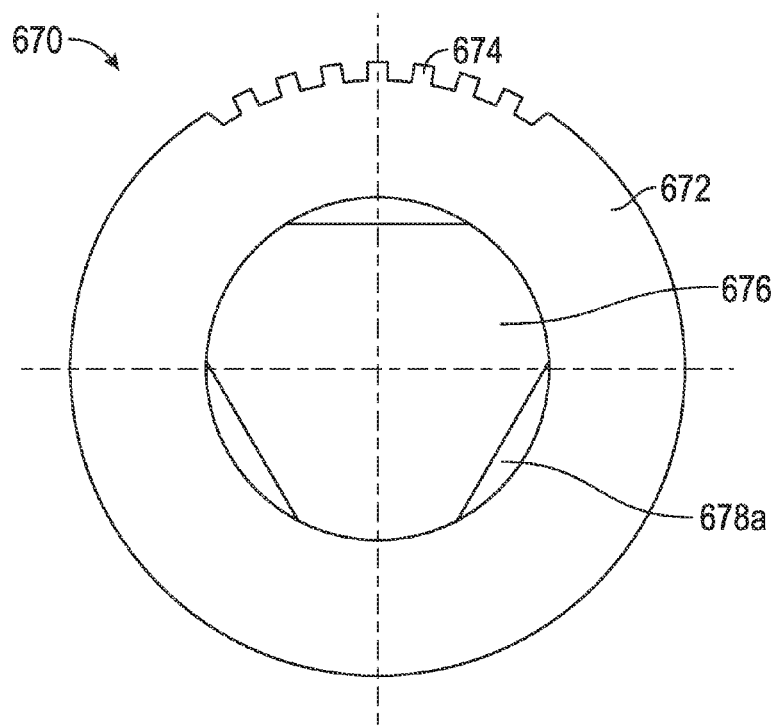
FIG. 8 is a pictorial view of another embodiment of an eccentric adjuster retainer of the eccentric adjuster assembly.

Referring to FIG. 8, in the illustrated embodiment, the outer retaining features 674 include a partial toothed portion to engage the assist mechanism housing 61. The outer retaining features 674 prevent radial movement of the eccentric adjuster retainer 670 and in turn, the eccentric adjuster 62. The outer retaining feature 674 can include teeth or other features configured to engage an assist mechanism housing 61 to prevent rotation. Further, in certain embodiments, the eccentric adjuster retainer 670 can be deformed to engage the assist mechanism housing 61 via a staking operation. The staking operation can deform an outer retaining feature 674, the assist mechanism housing 61 or a combination thereof to allow the eccentric adjuster retainer 670 and the assist mechanism housing 61 to be engaged to prevent the radial movement of the eccentric adjuster 62. In the illustrated embodiment, the flat portions of the cavity 676 can provide an internal retaining feature 678a.

Figure 9:
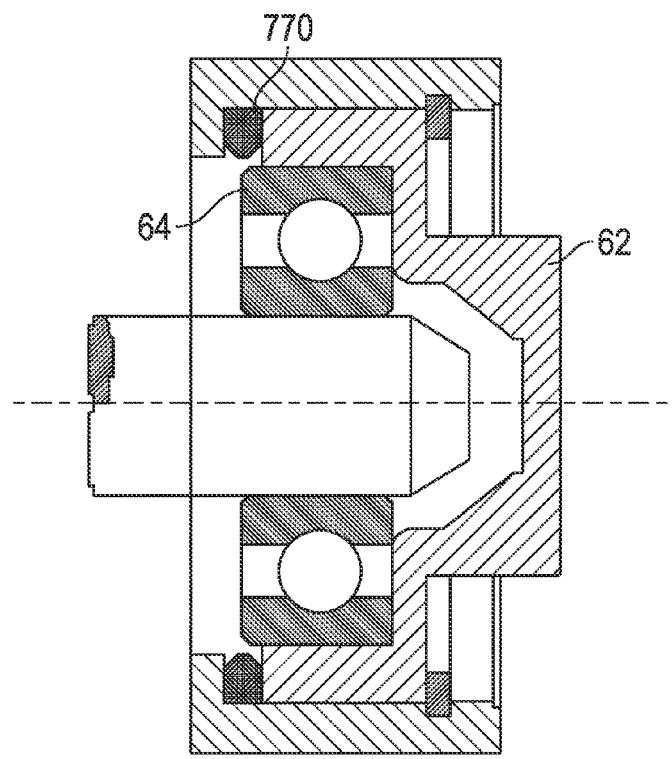
FIG. 9 is a pictorial view of another embodiment of an eccentric adjuster retainer of the eccentric adjuster assembly.

Referring to FIG. 9, in the illustrated embodiment, the eccentric adjuster retainer 770 is an O-ring located between the assist mechanism housing 61 and the eccentric adjuster 62. In the illustrated embodiment, the eccentric adjuster retainer 770 retains the eccentric adjuster 62 by providing a high coefficient of friction between the assist mechanism housing 61 and the eccentric adjuster 62.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An eccentric adjuster assembly comprising:
   a housing;
   an eccentric adjuster;
   an axial retainer; and
   an eccentric adjuster retainer configured to retain the eccentric adjuster relative to the housing, the eccentric adjuster having an eccentric adjuster radial position and an eccentric adjuster axial position, the eccentric adjuster retainer comprising:
      a retainer body having an inner perimeter with a cavity disposed therein and an outer perimeter, the eccentric adjuster extending through the cavity and at least a portion of the outer perimeter engaging the housing to retain the eccentric adjuster radial position relative to the housing, an orientation of the retainer body is adjustable relative to the housing.

2. The eccentric adjuster retainer of claim 1, further comprising at least one tab adjacent to the cavity, wherein the at least one tab engages the eccentric adjuster.

3. The eccentric adjuster retainer of claim 1, wherein the axial retainer retains the eccentric adjuster axial position.

4. The eccentric adjuster retainer of claim 1, wherein the portion of the outer perimeter contains a plurality of teeth to engage the housing.

5. The eccentric adjuster retainer of claim 1, wherein the portion of the outer perimeter contains a detent to engage the eccentric adjuster.

6. The eccentric adjuster retainer of claim 1, wherein the portion of the outer perimeter contains an adjustment cavity to engage the housing.

7. The eccentric adjuster retainer of claim 6, wherein the adjustment cavity receives an adjustment screw.

8. An electric power steering system comprising:
   a steering shaft connected to a handwheel at one end and a rack and pinion steering mechanism at an opposite end; and
   a steering assist unit comprising an electric motor operated by a controller and driving a worm shaft and a worm gear interposed between said worm shaft and said steering shaft;
   the worm shaft including an eccentric adjuster assembly comprising:
      a housing;
      an eccentric adjuster;
      an axial retainer that retains the eccentric adjuster relative to the housing;
      an eccentric adjuster retainer configured to retain the eccentric adjuster relative to the housing, the eccentric adjuster having an eccentric adjuster radial position and an eccentric adjuster axial position, the eccentric adjuster retainer comprising:
         a retainer body having an inner perimeter with a cavity disposed therein and an outer perimeter, the eccentric adjuster extending through the cavity and at least a portion of the outer perimeter engaging the housing to retain the eccentric adjuster radial position relative to the housing, the portion of the outer perimeter contains a plurality of teeth to engage the housing.

* * * * *